No. 867,215. PATENTED SEPT. 24, 1907.
C. S. SHARP.
CORN HARVESTER.
APPLICATION FILED OCT. 6, 1902.
2 SHEETS—SHEET 2.
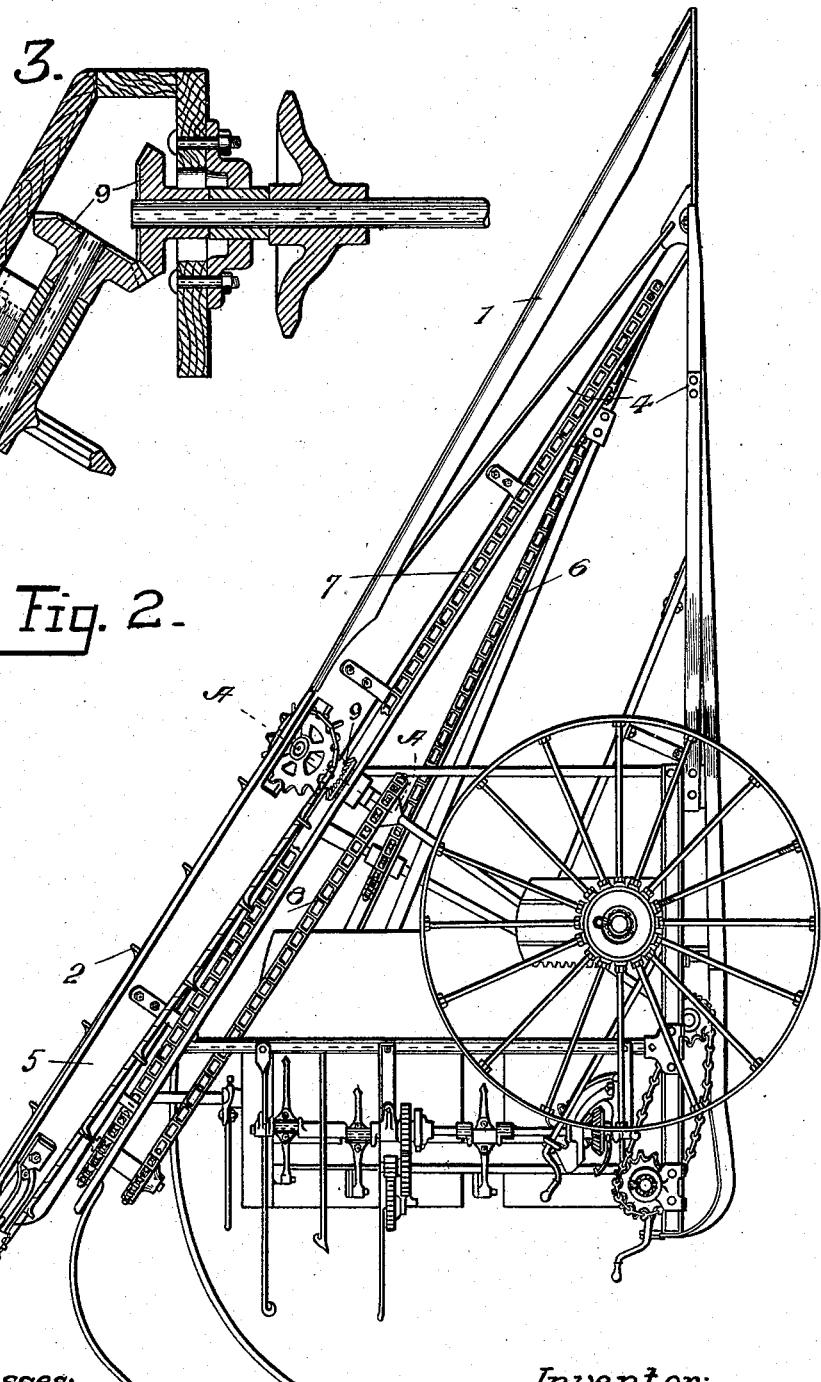
Witnesses:
Chas. J. Toner.
F. G. Bodell.
Inventor:
Charles S. Sharp.
By Hoey & Parsons,
Attorneys.

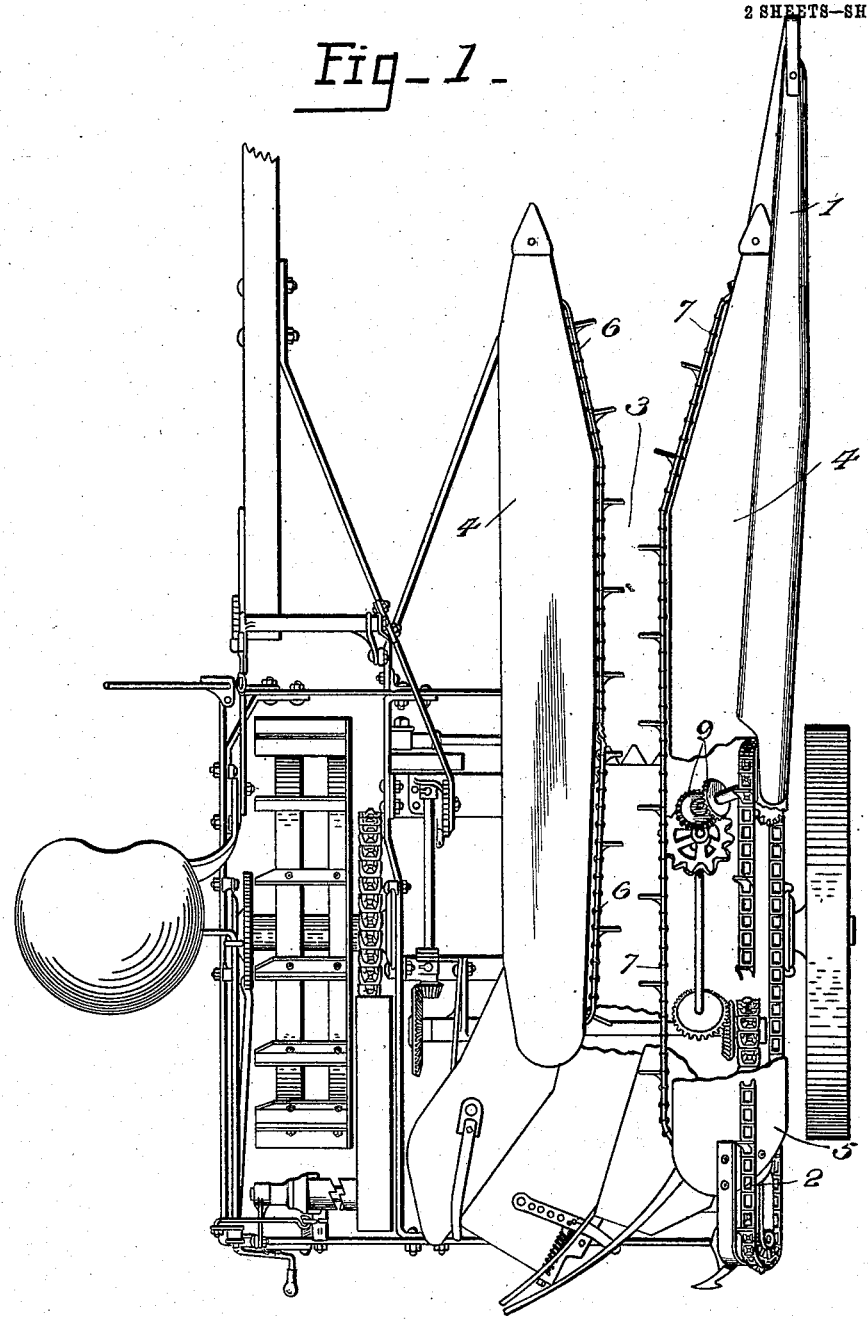

UNITED STATES PATENT OFFICE.

CHARLES S. SHARP, OF AUBURN, NEW YORK, ASSIGNOR, BY MESNE ASSIGNMENTS, TO INTERNATIONAL HARVESTER COMPANY, A CORPORATION OF NEW JERSEY.

CORN-HARVESTER.

No. 867,215.  Specification of Letters Patent.  Patented Sept. 24, 1907.

Application filed October 6, 1902. Serial No. 126,209.

*To all whom it may concern:*

Be it known that I, CHARLES S. SHARP, of Auburn, in the county of Cayuga and State of New York, have invented a certain new and useful Corn-Harvester, of which the following is a specification.

My invention relates to corn-harvesters, and has for its object the production of means of simple construction for rendering the machine particularly efficient in harvesting corn leaning, or bent over, in the field, or of a height, or character tending to cause the corn to bend over when feeding through the corn-passage; and to this end, the invention consists in the novel combinations and constructions hereinafter set forth and claimed.

In describing this invention, reference is had to the accompanying drawing, in which like characters designate corresponding parts in all the views.

Figure 1 is a top plan, partly broken away, of a preferable embodiment of my invention. Fig. 2 is an elevation of the corn-harvester shown in Fig. 1. Fig. 3 is a sectional view taken on line A—A, Fig. 2.

My present invention preferably comprises a corn-passage, means for feeding the corn rearwardly through said passage, a supplemental arm 1, and an additional feeding device 2.

The corn-passage 3 is usually laterally-confined by opposite gathering arms 4 of any suitable construction, here illustrated as provided with upper surfaces extending upwardly and rearwardly from their front ends and adapted to engage and support the corn in its movement through the passage 3, the upper surfaces of said gathering arms being shown as extending downwardly and inwardly as at 5 from their outer longitudinal edges. As best seen in Figs. 1 and 2, the means for feeding the corn rearwardly through the passage 3 preferably comprises rearwardly-working feeding devices 6 7 suitably carried or supported by the gathering arms 4 at opposite sides of the passage 3 and extending upwardly and rearwardly at different inclinations from their front portions or receiving ends, and beneath the upper surfaces of said arms 4, and also comprises a rearwardly-working feeding device 8 arranged at the outer side of the passage 3 beneath the rear portion of the feeding device 7, and also extending upwardly and rearwardly from its front portion. The feeding device 8 is shown as movable at greater speed than the feeding devices 6 7, but this is not an essential feature of my present invention. Said feeding devices 6 7 8 which are here illustrated as chains having lateral projections at intervals along their length, are actuated by any desirable mechanism, unnecessary to describe herein. In addition to the feeding devices 6 7 8, my corn-harvester is usually provided with any suitable butt-feeding means and binding mechanism, but as these form no part of this invention, I have deemed it unnecessary to describe the same herein. The corn-passage 3, gathering arms 4, and feeding devices 6 7 8 are particularly applicable for use with my supplemental arm 1 and corn-feeding device 2, but this invention is not restricted to any particular construction of corn-passage, gathering arms, or means, in addition to the device 2, for feeding the corn.

The supplemental arm 1 is arranged above diverges from and projects in advance of a side, or corn-engaging or supporting surface, of the corn-passage 3, being here shown as arranged directly above the outer portion of the front end of the outer gathering arm 4 as formed of less width than the underlying part of the outer arm 4 and as projecting in advance of said front end. This supplemental arm 1 diverges forwardly and downwardly from the outer gathering arm, its front end terminating close to the ground in advance of the outer gathering arm, and its rear end meeting the uppermost surface of said gathering arm. Preferably said arm 1 is provided with an upper face of rounding cross-section inclined upwardly toward its rear end at an angle with the upper face of the front end of the outer gathering arm, and is secured at its ends to said outer gathering arm by any desirable means, as bolts, unnecessary to describe herein, for permitting ready detachment of the supplemental arm.

The additional feeding device 2 also works rearwardly and is provided with corn-engaging means projecting above the rear part of the upper surface of a side or wall of the corn-passage, being here illustrated as extending above the rear part of the inclined supporting face 5 on the outer gathering arm 4 at the rear of the front portion of the feeding device 7, and as movable in an inclined plane arranged at substantially right-angles to the inclined face 5. Said feeding device 2 is preferably of substantially the same construction as the feeding devices 6 7 8, is arranged with its receiving end in substantially the same horizontal plane as the central part of the feeding device 7 is suitably connected to said feeding devices so as to operate simultaneously therewith, and is also readily removable by any desirable means, unnecessary to describe herein. In Fig. 3 the power-transmitting means for actuating the feeding device 2 is shown as intermeshing bevel-pinions 9 connected, respectively, to shafts provided with sprocket-wheels engaging the endless chains forming the feeding devices 8 2, but it will be understood that my invention is not limited to such transmitting means.

In the operation of a corn-harvester embodying my invention, the supplemental arm 1 enters beneath the leaning, or bent over, portion of the corn in close proximity to the ground and gradually raises the corn without undue strain thereon, and before the same is engaged by the gathering arms, or is within the ordinary corn-passage. In case the corn is tall and tends to fall over upon the rear part of the outer gathering arm, the engaging device 2 feeds the bent over portion of the corn and prevents the friction, strain and clogging which would otherwise result.

The construction and operation of my corn-harvester will now be readily understood upon reference to the foregoing description and the accompanying drawing, and it will be obvious that more or less change may be made therein without departing from the spirit of my invention.

Having thus fully described my invention, what I claim as new and desire to secure by Letters Patent, is:—

1. In a corn-harvester, a corn-passage one of the walls thereof having an upper surface adapted to engage the corn, and a supplemental arm arranged above, diverging from and projecting in advance of the upper surface of said one of the walls of the corn-passage, substantially as and for the purpose described.

2. In a corn-harvester, the combination with a corn-passage, and opposite gathering arms, each arm having a corn-supporting surface; of a supplemental arm arranged above the front end of the corn-supporting surface of one of the gathering arms, the supplemental arm diverging forwardly and downwardly from said one of the gathering arms and terminating close to the ground in advance of said gathering arm, substantially as and for the purpose described.

3. In a corn-harvester, the combination with a corn-passage, and opposite gathering arms, each arm having a corn-supporting surface; of a supplemental arm arranged above the front end of the corn-supporting surface of one of the gathering arms, the supplemental arm diverging forwardly and downwardly from said one of the gathering arms and terminating close to the ground in advance of said gathering arm, the rear end of said supplemental arm meeting the uppermost surface of said gathering arm, substantially as and for the purpose set forth.

4. In a corn-harvester, a corn-passage having an upper surface adapted to engage the corn, and a supplemental arm arranged above, diverging from and projecting in advance of said surface, the supplemental arm having its upper face inclined upwardly toward its rear end and formed rounding in cross-section, substantially as and for the purpose set forth.

5. In a corn-harvester, the combination with a corn-passage, and opposite gathering arms, each arm having a corn-supporting surface; of a supplemental arm arranged above the front end of the corn-supporting surface of one of the gathering arms, the supplemental arm diverging forwardly and downwardly from said one of the gathering arms and terminating close to the ground in advance of said gathering arm, said supplemental arm having its upper face inclined upwardly toward its rear end and formed rounding in cross-section, substantially as and for the purpose specified.

6. In a corn-harvester, the combination with a corn-passage, and opposite gathering arms, each arm having a corn-supporting surface; of a supplemental arm arranged above the front end of the corn-supporting surface of one of the gathering arms, the supplemental arm diverging forwardly and downwardly from said one of the gathering arms and terminating close to the ground in advance of said gathering arm, the rear end of said supplemental arm meeting the uppermost surface of said gathering arm, said supplemental arm having its upper face inclined upwardly toward its rear end and formed rounding in cross-section, substantially as and for the purpose described.

7. In a corn-harvester, a corn-passage with walls having upper corn-supporting surfaces extending upwardly and rearwardly, means beneath said surfaces for feeding the corn rearwardly, said means extending upwardly and rearwardly, and a feeding device extending upwardly and rearwardly and having corn-engaging means projecting above the corn-supporting surface at one side of the passage, the receiving end of said feeding device being located in substantially the same horizontal plane as the central part of the first-mentioned means, substantially as and for the purpose set forth.

8. In a corn-harvester, a corn-passage with walls having upper corn-supporting surfaces extending upwardly and rearwardly, a gathering arm at the outer side of said passage the rear part of the upper surface of the gathering arm being extended downwardly from its outer longitudinal side toward its inner longitudinal side, means for feeding the corn rearwardly, and a feeding device having corn-engaging means projecting above the downwardly-extended rear part of the upper surface of the gathering arm, and movable in an inclined plane arranged at substantially right-angles to said downwardly-extended part, substantially as and for the purpose described.

9. In a corn-harvester, a corn-passage, devices, one on each side of the passage, for feeding the corn rearwardly, and an additional feeding device at one side of the passage having corn-engaging means projecting above the upper face of the wall of said side of the passage, substantially as and for the purpose specified.

10. The combination in a corn-harvester; of forwardly-projecting gathering arms forming a passage, devices for feeding the corn rearwardly carried by said arms on each side of the passage, said devices extending upwardly and rearwardly at different inclinations, and an additional feeding device at one side of the passage having corn-engaging means projecting above the upper face of said side of the passage, substantially as and for the purpose set forth.

11. In a corn-harvester, a corn-passage, devices, one on each side of the passage for feeding the corn rearwardly, and an additional feeding device at one side of the passage having corn-engaging means projecting above the upper face of the wall of said side of the passage, the receiving end of the additional feeding device being located above the receiving ends of the first-mentioned feeding devices, substantially as and for the purpose described.

12. In a corn-harvester, a corn-passage one wall thereof having an upper surface adapted to engage the corn, a supplemental arm arranged above and projecting in advance of the front end of said surface, and a feeding device having corn-engaging means projecting above the rear end of said surface, substantially as and for the purpose set forth.

13. In a corn-harvester, opposite gathering arms forming a passage, each arm having a corn-engaging surface, a supplemental arm arranged above the front end of the corn-engaging surface of the outer gathering arm, and projecting in advance of said gathering arm, and a feeding device having corn-engaging means projecting above the rear end of the corn-engaging surface of said outer gathering arm, substantially as and for the purpose described.

14. In a corn-harvester, a corn-passage with walls having an upper corn-engaging surface at each side thereof, means beneath said surfaces for feeding the corn rearwardly along the passage, a supplemental arm at one side of the passage arranged above and projecting in advance of the front end of the corn-engaging surface at said side of the passage, and a feeding device at one side of the passage having corn-engaging means projecting above the rear end of the corn-engaging surface at said side of the passage, substantially as and for the purpose specified.

In testimony whereof, I have hereunto signed my name in the presence of two attesting witnesses, at Auburn, in the county of Cayuga, in the State of New York, this 17th day of March, 1902.

CHARLES S. SHARP.

Witnesses:
W. H. HARRIS,
ARTHUR E. PARSONS.